(12) United States Patent
Carow

(10) Patent No.: US 6,223,954 B1
(45) Date of Patent: May 1, 2001

(54) PUMP ACTUATOR WITH PLASTIC SPRING

(75) Inventor: Robert N. Carow, 7810 Virginia Rd., Crystal Lake, IL (US) 60039-0428

(73) Assignee: Robert N. Carow, Crystal Lake, IL (US)

( * ) Notice: Subject to any disclaimer, the term of this patent is extended or adjusted under 35 U.S.C. 154(b) by 0 days.

(21) Appl. No.: 09/635,828

(22) Filed: Aug. 10, 2000

(51) Int. Cl.⁷ ........................................... G01F 11/42
(52) U.S. Cl. ........................................ 222/340; 222/321.7
(58) Field of Search .................... 222/340, 341, 222/321.1, 321.7, 321.9, 336

(56) References Cited

U.S. PATENT DOCUMENTS

| | | | |
|---|---|---|---|
| 2,597,650 | * 8/1952 | Maehren | 222/340 |
| 4,471,893 | 9/1984 | Knickerbocker . | |
| 5,042,696 | * 8/1991 | Williams | 222/340 |
| 5,447,257 | 9/1995 | Dark . | |
| 5,673,824 | 10/1997 | Evans . | |
| 5,924,603 | 7/1999 | Santagiuliana . | |

* cited by examiner

Primary Examiner—Philippe Derakshani
Assistant Examiner—Thach H. Bui
(74) Attorney, Agent, or Firm—Cook, Alex, McFarron, Manzo, Cummings & Mehler, Ltd.

(57) ABSTRACT

A pump actuator assembly for mounting on a disposable plastic container having a neck and a cap mounted on the neck. A spring trapped between the pump actuator and the cap. The spring formed from a tubular sleeve of elastic plastic material with longitudinally extending slits formed in the tubular sleeve. In one embodiment, the sleeve is independent of the cap and sleeve. In another embodiment, the sleeve is formed integrally with the cap. In a third embodiment, the sleeve is formed integrally with the pump actuator. In a fourth embodiment, the sleeve is hooked to the cap.

7 Claims, 2 Drawing Sheets

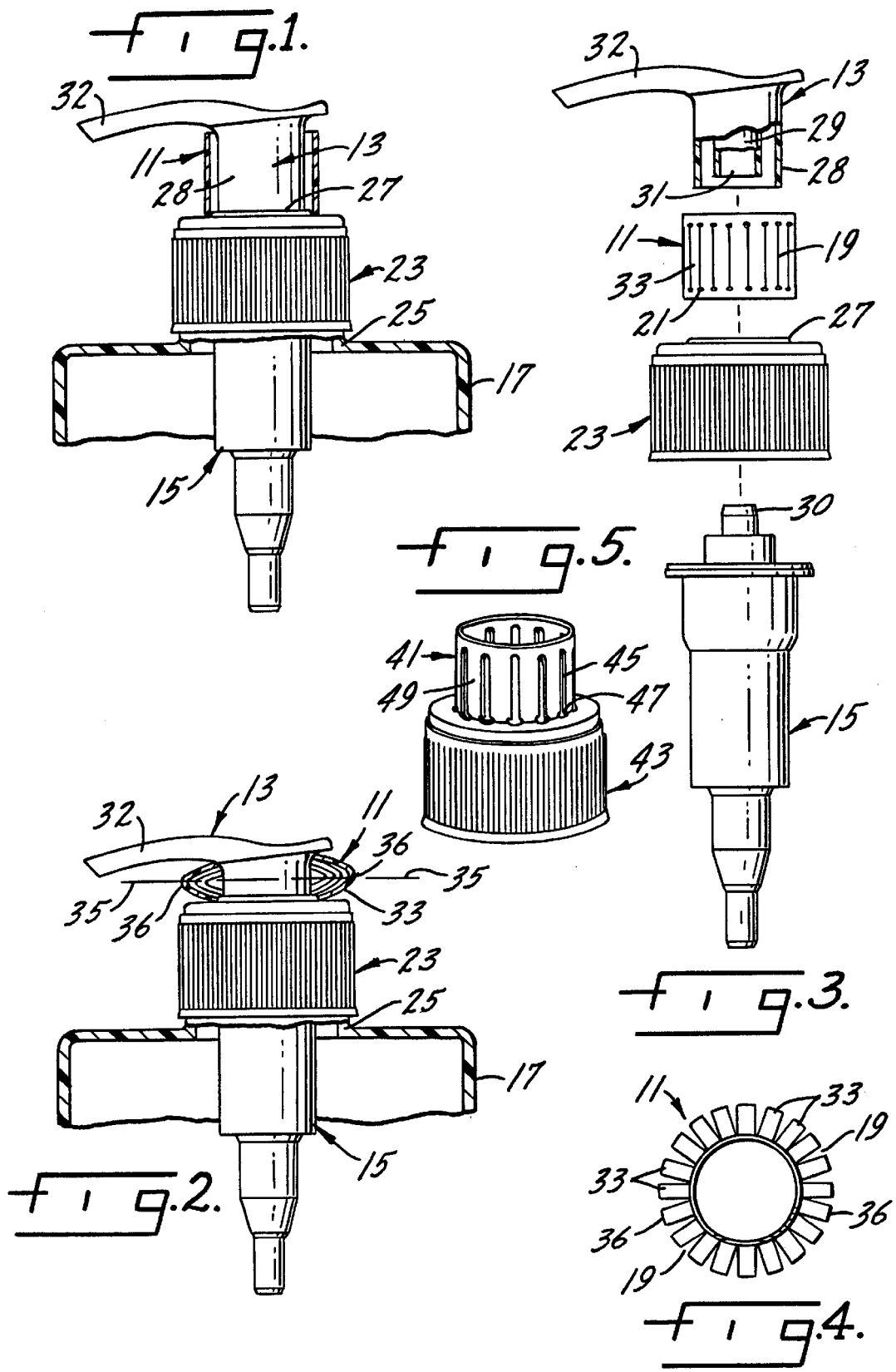

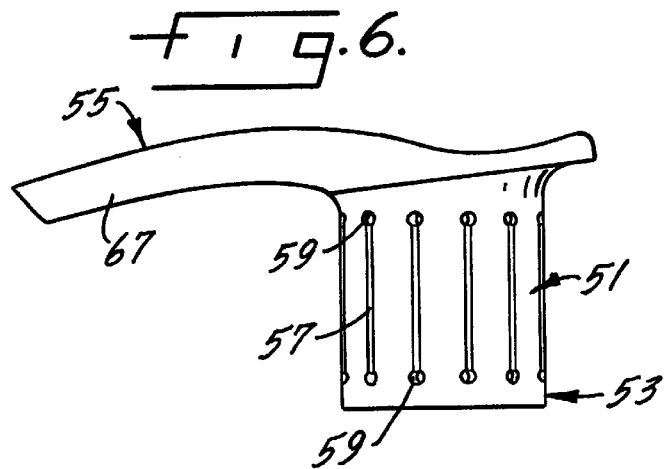
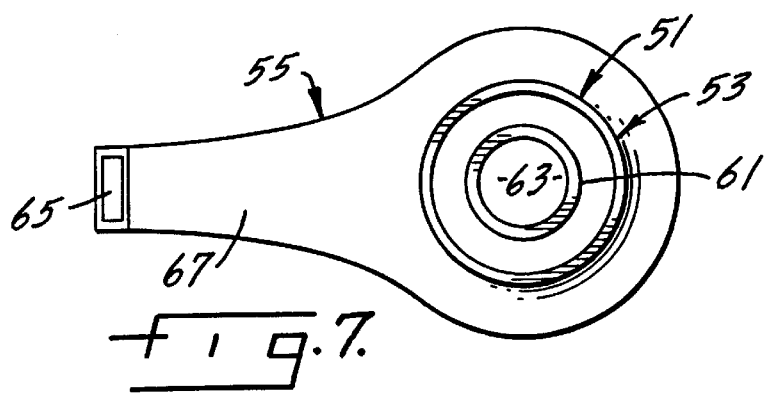
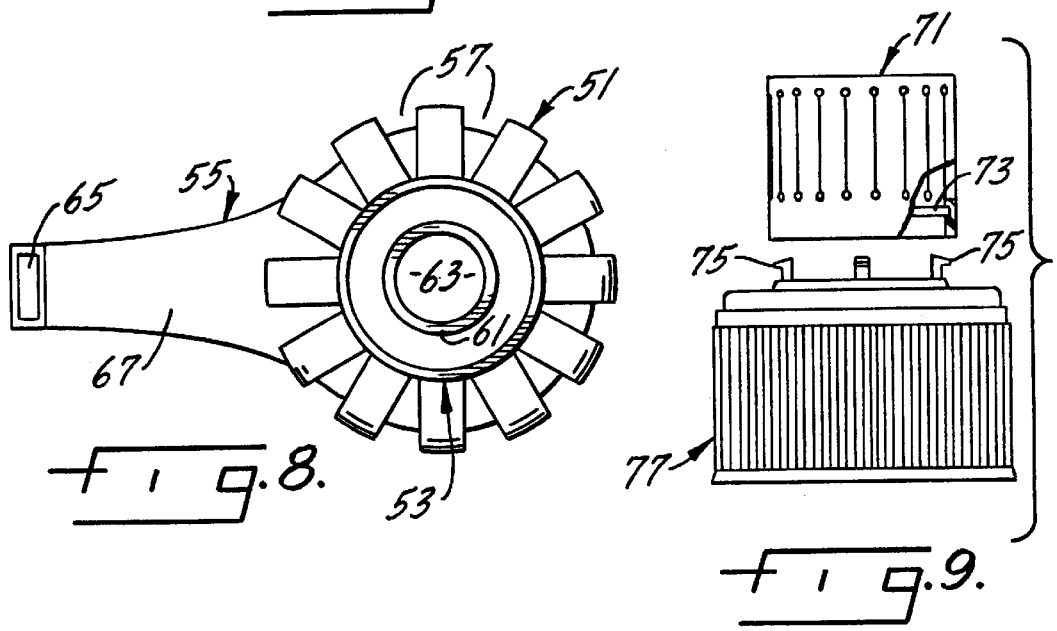

PUMP ACTUATOR WITH PLASTIC SPRING

BACKGROUND AND SUMMARY OF THE INVENTION

Small finger operated pumps are commonly used for dispensing liquids, especially personal care products, from small hand held containers. These pumps and their containers are conventionally made of plastic and a typical pump, its container and contents are sold together. The container is filed with a personal care product such as a cream, soap, cosmetic or other liquid or gel. The pump and container are usually disposed of when the contents of the container are consumed, making the entire product a consumable item. Recycling the pump and its container has been difficult because the pump conventionally a includes a metal return spring.

This invention is directed to a plastic spring for a disposable plastic container having a finger operated pump which is attractive, functional and disposable.

An object of this invention is a plastic spring which may be adapted for installation on a conventional personal products container having a finger operated pump.

Another object of this invention is a plastic spring which is sufficiently attractive to be mounted where it is visible on dispensing container.

Yet another object of this invention is a compressible plastic spring that may be formed by injection molding.

Still another object of this invention is a compressible plastic spring that may be integrally molded with a container cap.

A further object of this invention is a compressible plastic spring that may be molded integrally with the pump actuator to facilitate assembly of the pump.

BRIEF DESCRIPTION OF THE DRAWINGS

FIG. 1 is a partial side elevational view of the spring of this invention mounted on a personal care product container and pump with some parts broken away and others shown in cross section;

FIG. 2 is a view similar to the view of FIG. 1 with the pump shown in its depressed condition and the spring shown in its compressed stage;

FIG. 3 is an exploded view of the pump assembly of FIG. 1;

FIG. 4 is a top plan view of the spring shown in its compressed stage of FIG. 2;

FIG. 5 is a front orthographic view of another embodiment of the invention in which the spring is formed integrally with a container cap;

FIG. 6 is an enlarged, front elevational view of a modified pump actuator having an integral return spring;

FIG. 7 is a bottom plan view of the pump actuator of FIG. 6;

FIG. 8 is a bottom plan view of the pump actuator of FIG. 7 with the spring shown in its flattened or compressed condition; and FIG. 9 is an exploded view of yet another modified pump actuator.

DESCRIPTION OF THE PREFERRED EMBODIMENTS

FIGS. 1 through 4 of the drawings show the first embodiment of the spring 11 of the invention. The spring 11 may be injection molded of a suitable plastic which may be the same color as the actuator 13 for the pump 15 and the plastic container 17 or an entirely different color for contrast.

The pump 15 is of conventional construction, except the return spring which is metal and located inside the pump may be omitted, when the spring 11 is made sufficiently resilient to return the pump actuator to its upright position as shown in FIG. 1. In this embodiment, the spring 11 is molded in the shape of a cylindrical tube having longitudinally extending slits 19 spaced around the cylindrical tube. To avoid cracking or splitting, circular notches 21 are formed at the upper and lower ends of the slots 19.

The spring 11 of this embodiment of the invention is intended to be used to supplement the return force of the metal spring. As shown in FIGS. 1, 2 and 3 of the drawings, the spring 11 is positioned on top of a container cap 23 which threads onto the neck 25 of the container. The cap 23 is molded with a stub collar 27 which telescopes inside the lower end of the spring 11. The pump actuator 13 includes a tubular outer sleeve 28 which telescopes inside the upper end of the spring 11. A shorter, inner sleeve 29, which receives the outlet 30 of the pump 15, is also formed integrally with the actuator 13. Usually the outlet 30 of the pump is force fitted into the inner sleeve 29 of the pump actuator to hold the assembly together. The inner sleeve is formed with an inlet 31 which connects with an outlet (not shown) located at the distal end of the outlet nozzle 32. Thus, the spring 11 is captured between the pump actuator 13 and the container cap 23 so that it will be compressed upon downwardly movement of the pump actuator. Compression of the spring 11, as can be best seen in FIGS. 2 and 4 of the drawings, collapses the tubular spring 11 about its middle causing the ribs 33 of the spring which are defined by the slits 19 to flatten about a horizontal plane 35 through the middle of the spring as shown in FIGS. 2 and 4 of the drawings while maintaining rounded, bowed edges 36 at the center of the spring to absorb energy to return the spring to its elongated shape after pressure is released from the pump actuator.

A second embodiment of the invention is shown in FIG. 5 of the drawings. In this embodiment of the invention, the spring 41 is formed integrally with a cap 43 which threads onto the neck 25 of the plastic container 17. The spring 41 is formed with slits 45 having circular notches 47 formed at least at the lower ends of the slits. Ribs 49 are formed between the slits. This embodiment of the invention is intended to be used in situations where the metal return spring inside the pump is eliminated to make the container and pump completely recyclable. The forming of the spring integrally with the cap simplifies assembly of the pump and container on high speed container filling machines and assembly lines.

A third embodiment of the invention is shown in FIGS. 6, 7 and 8 of the drawings. In this embodiment of the invention, the spring 51 is molded integrally with an outer sleeve 53 of the pump actuator 55. The spring is formed with slits 57 having circular notches 59 formed at opposite ends of the slits. A shorter, inner sleeve 61 which engages the pump mechanism, such as pump mechanism 15 shown and described in connection with the embodiment of FIGS. 1 to 4, is formed integrally with the actuator 55. The inner sleeve includes an inlet 63 which connects with an outlet 65 formed in an outlet nozzle 67. This third embodiment of the invention not only saves expense by eliminating the need to manufacture, inventory and handle a separate return spring for the pump actuator but also simplifies assembly of the pump and container on high speed container filling machines and assembly lines.

A fourth embodiment of the invention is shown in the exploded view of FIG. 9 of the drawings. In this embodiment, the spring 71 is similar to spring 11 shown in the first embodiment of the invention but includes an internal groove 73 formed a short distance inwardly of the lower end of the spring as viewed in FIG. 9. The groove 73 is sized and positioned to receive resilient hooks 75 formed integrally with a container cap 77 which threads onto the neck of a container. The hooks snap into locking engagement with the groove 73. This arrangement simplifies assembly of the spring 71 and container cap 77 for use on high speed container filling machines and assembly lines.

The slits 19, 45 and 57 which are formed in spring 11 and the sleeves 41 and 53 may be formed during the injection molding process or may be cut using a notched wheel in a secondary step. It should be understood and appreciated that the slits may also be formed using other conventional process known to one skilled in the art without deviating from the teachings of this invention.

What is claimed is:

1. A pump actuator for mounting on a container having a neck, said pump actuator having a discharge spout located above said neck, a pump having an inlet located in said container, a cap mounted on said neck, said pump having an outlet communicating with said pump actuator, a spring trapped between said cap and said discharge spout of said pump actuator, said spring comprising a tubular sleeve of elastic material having top and bottom edges, and a plurality of longitudinally extending slits formed in said tubular sleeve with said slits terminating short of said top and bottom edges of said tubular sleeve.

2. The pump of claim 1 in which said spring is formed integrally with said cap.

3. The pump of claim 1 in which said spring is formed integrally with said pump actuator.

4. A compressible tubular sleeve with spring-like qualities having an elongated cylindrical wall with top and bottom edges, longitudinally extending slits formed in said cylindrical wall of said tubular sleeve with said slits terminating short of said top and bottom edges of said cylindrical wall, and circular notches formed at the top and bottom ends of said slits.

5. The sleeve of claim 4 which is formed of an injection molded plastic.

6. The sleeve of claim 4 in which an inwardly opening groove is formed in the inner wall of said tubular sleeve, said groove is shaped to receive and connect to hooks.

7. A pump actuator for mounting on a container having a neck, said pump actuator having a discharge spout located above said neck, a cap mounted on said neck, said pump having an outlet communicating with said pump actuator, a spring positioned between said cap and said discharge spout of said pump actuator, said spring comprising a tubular sleeve of elastic material having top and bottom edges, a plurality of longitudinally extending slits formed in said tubular sleeve with said slits terminating short of said top and bottom edges of said tubular sleeve, an inwardly opening groove formed in an inner wall of said tubular sleeve above said bottom edge thereof and below said slits, and upwardly extending hooks formed on said cap, said hooks formed to be received in said groove to secure said spring to said cap.

\* \* \* \* \*